United States Patent [19]

Brough et al.

[11] Patent Number: 4,601,461

[45] Date of Patent: Jul. 22, 1986

[54] LADING PROTECTION DEVICE

[75] Inventors: Steve A. Brough, Gardners; Mark P. Scott, Boiling Springs, both of Pa.

[73] Assignee: Keystone Industries Inc., Camp Hill, Pa.

[21] Appl. No.: 609,816

[22] Filed: May 14, 1984

[51] Int. Cl.$^4$ ............................................... F16F 9/06
[52] U.S. Cl. ................... 267/64.15; 92/107; 137/454.5; 188/322.17; 213/43; 267/129; 277/73
[58] Field of Search ............ 188/319, 315, 317, 322.11, 188/322.13, 322.15, 322.16, 322.17, 322.19, 322.22, 284, 285, 289, 280, 298, 297; 267/64.15, 64.22, 64.23, 64.26, 116, 8 R, 3, 35, 129, 113; 213/43; 384/99; 308/3.5; 137/454.5, 540; 92/107, 168 B, 24 B; 277/215, 73, 74, 76

[56] References Cited

U.S. PATENT DOCUMENTS

| Re. 27,159 | 8/1971 | Campbell et al. | 213/43 |
|---|---|---|---|
| 2,018,312 | 10/1935 | Moulton | 92/107 X |
| 2,970,574 | 2/1961 | Geyer | 92/107 X |
| 3,011,778 | 12/1961 | Yntema | 267/64.26 |
| 3,150,782 | 9/1964 | Campbell et al. | 213/43 |
| 3,150,783 | 9/1964 | Campbell et al. | 213/43 |
| 3,158,054 | 7/1969 | Thompson | 213/43 |
| 3,251,481 | 5/1966 | Karakashjan et al. | 213/43 |
| 3,368,698 | 2/1968 | Cardwell | 213/43 |
| 3,447,693 | 6/1969 | Cardwell | 213/22 |
| 3,534,870 | 10/1970 | Daugherty, Jr. | 213/8 |
| 3,542,212 | 11/1970 | Daugherty, Jr. | 213/43 |
| 3,713,546 | 1/1973 | Daugherty, Jr. | 213/43 |
| 3,827,700 | 8/1974 | Kaller | 277/73 X |
| 3,917,075 | 11/1975 | Knippel | 213/43 X |
| 4,300,585 | 11/1981 | Taylor | 92/107 X |

FOREIGN PATENT DOCUMENTS

| 1334048 | 12/1963 | France | 213/43 |
|---|---|---|---|
| 736427 | 9/1955 | United Kingdom | 188/319 |
| 2076932 | 12/1981 | United Kingdom | 188/322.17 |

*Primary Examiner*—Bruce H. Stoner, Jr.
*Assistant Examiner*—Michael P. Gilday
*Attorney, Agent, or Firm*—Leydig, Voit & Mayer, Ltd.

[57] ABSTRACT

A lading protection device in the form of a shock absorber for a railway car including a cylinder containing a piston and a body of hydraulic fluid normally captive between the front face of the piston and the closed end of the cylinder. A flow control valve assembly, centered in the piston, mounts an orifice bushing defining a constricted circular orifice. The assembly includes a valve stem slidable in the piston with a spring at its inner end for pressing the stem in a direction to seal the orifice. The piston has a fluid passage extending therethrough and an annular separator piston defines, with the main piston, a receiving space into which the fluid flows upon impact. The space in back of the separator piston is filled with a charge of gas under high pressure so that when the impact has been dissipated the gas pressure acting upon the separator piston restores the fluid to its normal position in readiness for a succeeding impact. The invention also resides in the structure of the orifice bushing and a system of seals and lubrication which minimizes leakage over a long period of time.

18 Claims, 9 Drawing Figures

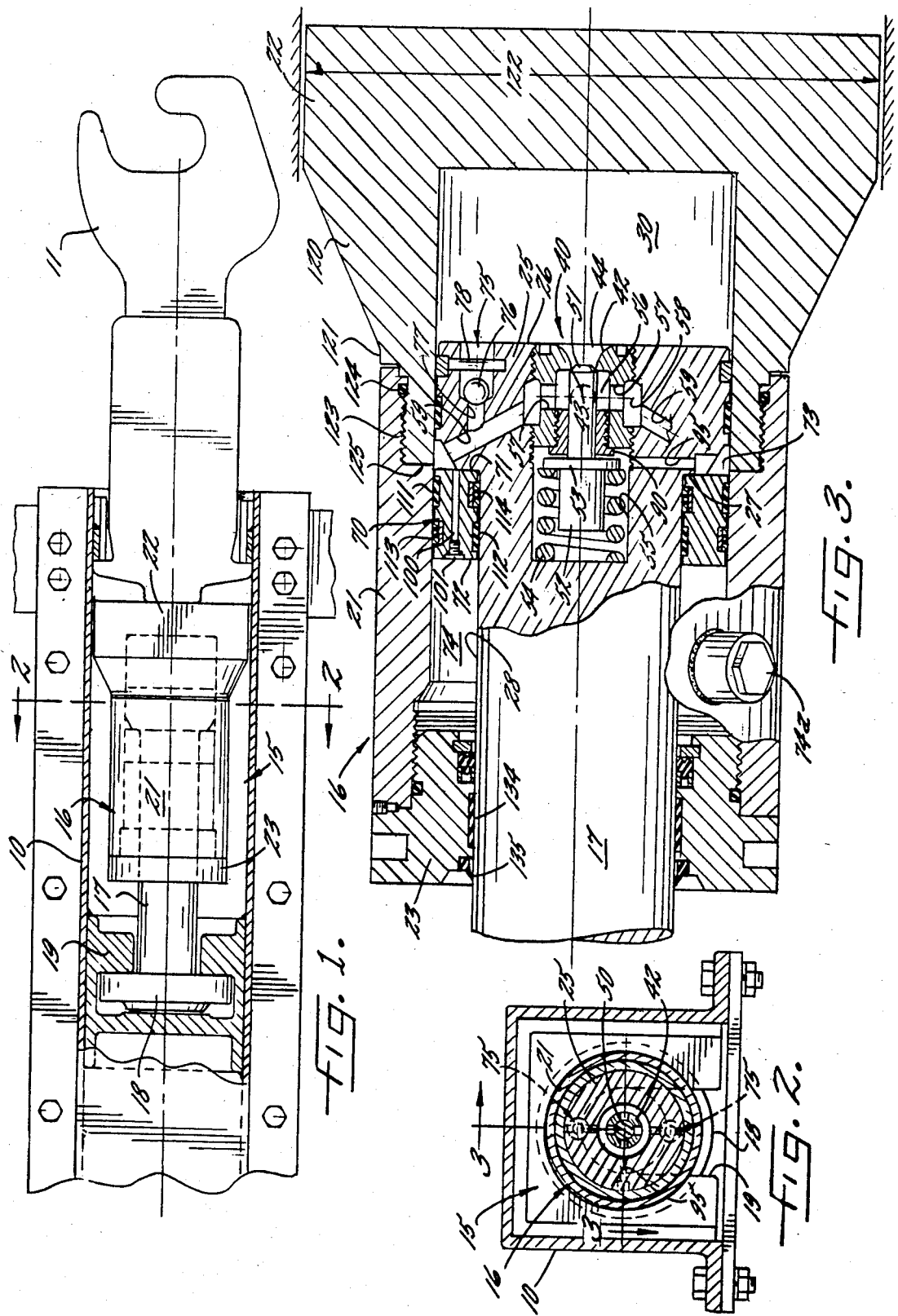

LADING PROTECTION DEVICE

Ever since the advent of railroading it has been the purpose of the car designer to protect the often fragile load, or lading, against high accelerational forces either during make-up of the train in the railroad yard as cars are intentionally collided or as a result of unintended collisions as well as "train action" during transport. By "train action" is meant impact, either in buff or tension, due to the play or lost motion between the couplers of adjacent cars as the train is accelerated and decelerated and, more particularly, as the train is started from a dead stop or is braked to a dead stop from the rolling condition.

In an effort to reduce the impact, regardless of cause, and to protect the lading, it is customary to interpose between each coupler and the car upon which it is mounted a shock absorbing device. Such devices are made by a number of manufacturers using standard envelope dimensions enabling them to fit in a standardized pocket in the sill of a car. The associated linkage is so arranged that each device is effective regardless of whether the impact is in buff or tension, and means are provided in the unit to restore it to a starting condition just as soon as an impact has been dissipated in readiness for the next impact, regardless of direction. Since the forces being dealt with are measured in the hundreds of thousands of pounds, the energy absorbed shows up as heat which is dissipated to the surrounding structure and to the atmosphere by conduction and convection.

The problem has been that while conventional devices are capable of absorbing and dissipating the energy of a light impact as, for example, the impact of cars in a railroad yard at relatively slow speeds of, say, three miles per hour, more severe impacts on the order of, say, six or eight miles per hour produce coupler forces which typically rise to 800,000 pounds or more, high enough to severely damage the lading. Indeed where the cushioning stroke is completely used up in the face of a severe impact, resulting in a so-called "oversolid" bottoming within the device, the force at the coupling may exceed a million and a quarter pounds. Thus it is easily possible to reach coupler forces which are high enough not only to damage the lading but to destroy the car structure.

While the main function of a shock absorber is to dissipate the energy of impact it is also necessary that a portion of the energy be stored in the device for the purpose of promptly returning it to its initial condition in readiness for a succeeding impact. For many decades this was accomplished by use of heavy coil springs. However, in recent years it has been recognized that such springs can be dispensed with and that both lightness and compactness can be achieved by utilizing a charge of gas under pressure to provide the return force. In such constructions the hydraulic fluid which is displaced on impact may act upon an auxiliary floating piston, which may also be referred to as a separator piston, exposed to the pressurized gas. The piston retreats in the face of the displaced hydraulic fluid, and the gas subsequently restores the floating piston, and the fluid, to their initial positions. A difficulty with this is that the gas must be confined to a relatively small volume and only a minute amount of leakage occurring over a period of time on the order of months may cause the device to become inoperative. The problem is compounded by the fact that failure of gas pressure is not only difficult to detect but detection and correction requires expensive man power. Even though the most modern seals are employed and even though the sealing surface of the piston rod may be plated and finely finished, miniscule cracks and imperfections remain which allow escape of the gas on a molecular scale, particularly where the plating is not constantly wetted by a lubricant.

It is, accordingly, an object of the present invention to provide an improved shock absorbing device, or lading protection device, utilizing hydraulic fluid with pressurized gas as the returning medium which is highly compact and of light weight, which maintains the force at the coupler, and especially the force on the lading, at a low level even at high impact speeds and which has an extremely long service life, providing reliable protection to the lading over longer periods than heretofore.

It is a more specific object of the invention to provide a lading protection device which has a relatively flat force characteristic as contrasted with the rapidly rising generally "parabolic" force characteristics typical of the prior art. In this connection it is an object to provide a lading protection device in which the force characteristic, particularly the threshold force, is conveniently and precisely adjustable at the time of original assembly, or in subsequent usage, depending upon the type of service for which the device is intended. Service factors include the size and weight of the car and its lading and the degree of tolerance of the lading to impact.

It is another object of the present invention to provide a lading protection device which operates smoothly and progressively in the face of an impact free of snap action or chattering and which provides prompt return to the initial condition.

In one of the aspects of the invention it is an object to provide a lading protection device which has a spring-pressed valve stem which provides positive sealing of the hydraulic fluid until the instant that a predetermined and adjustable threshold pressure is reached, with the flow of the fluid thereafter controlled in such a way as to keep the force at the lading to a safe and protective level. It is a more specific object to provide a control valve assembly which prevents any passage of hydraulic fluid by positive sealing until a precise threshold is reached and in which the force at the valve which is relied upon to prevent passage is proportional to the threshold pressure level for which the device has been adjusted.

It is yet another object of the present invention to provide a lading protection device which is inherently strong but which is efficiently constructed, with the cross-section of metal at the strategic points being proportioned to the total force which may be applied at such points as the device is either used or misused, resulting in long life and reducing the possibility of catastrophic failure to an absolute minimum. In this connection it is an object to produce a shock absorbing device which minimizes the possibility of "over-solid" bottoming but which is capable of resisting damage if such bottoming does, under extreme conditions, indeed occur.

In another aspect of the invention it is an object to provide a laing protection device which relies upon a charge of inert gas, such as nitrogen, under high pressure for return purposes and in which the gas, in the interest of compactness, is confined to a small volume, but in which leakage of such gas even on a molecular scale is prevented insuring a high degree of reliability over a long service life. Thus it is an object, in one of the aspects of the invention, to insure that the seal which acts upon the piston rod for the purpose of isolating the pressurized gas from the atmosphere constantly wets the piston rod with lubricant thereby to reduce the rate of leakage along the piston rod via microscopic cracks or other imperfections.

In another aspect of the invention, of which an embodiment has been illustrated and discussed, the floating piston is mounted upon an auxiliary internal sleeve which is statically sealed and in which there is no dynamic gas-to-atmosphere seal interface at which leakage might occur but, instead, the interface is of the fluid-to-atmosphere type, with the integrity of the fluid seal being insured by constant wetting of the piston rod by the hydraulic fluid contained within the device.

Other objects and advantages of the invention will become apparent upon reading the attached detailed description and upon reference to the drawings in which:

FIG. 1 is a plan view of a portion of the sill and coupler at one end of a railroad car, in partial section, showing one of the disclosed shock absorbers occupying its working position within the sill;

FIG. 2 is a cross-sectional view taken along line 2—2 in FIG. 1;

FIG. 3 is a longitudinal section looking along line 3—3 in FIG. 2 and showing the device in normal resting condition;

Figure 3A:
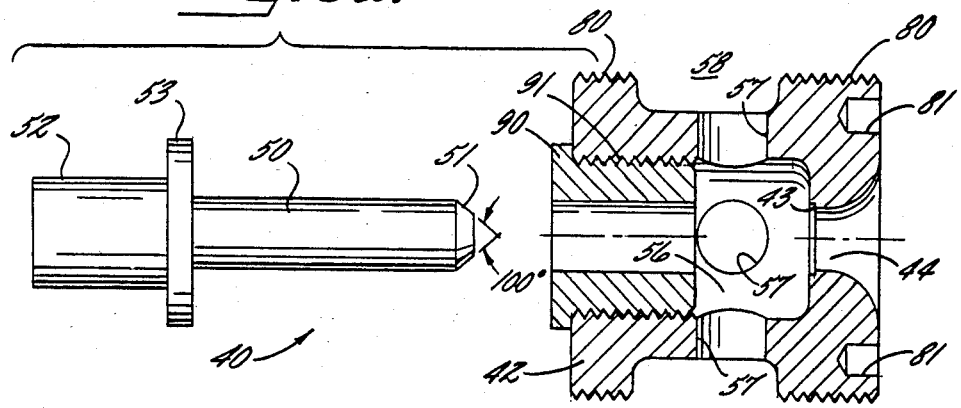
FIG. 3a is an enlarged view of the orifice bushing and valve stem in the device of FIG. 3.

While the invention is disclosed in certain preferred embodiments, it will be understood that the invention is not limited to the embodiments shown but it is intended, on the contrary, to cover the various alternative and equivalent constructions which may be included within the spirit and scope of the appended claims.

Turning now to FIG. 1 there is disclosed a lading protection device mounted in the sill 10 of a railway car. As shown in FIG. 2 the sill is in the form of an inverted channel of steel, rectangular in cross section, and which typically extends the length of the car in which it is installed. The sill at each end mounts a coupler such as that shown at 11. The lading protection device, or LPD, indicated at 15, is effectively interposed between the coupler and the sill. In installations of this type, linkages are commonly employed for compressing the shock absorber 15 regardless of whether the impact is in "buff" or in "tension". In the illustrated installation, the construction has been intentionally simplified to omit such linkage so that an impact in "buff" will be assumed throughout the discussion.

The shock absorber 15 includes a cylinder 16 and a piston rod 17. The enlarged end 18 of the piston rod is held captive in the pocket of a rod-receiving member 19 which is welded in place within the sill. The space between the coupler and the rod-receiving member is of standardized length and cross-section intended for receiving shock absorbers of standardized envelope dimensions made by various manufacturers.

Turning attention now to the shock absorber itself, illustrated in FIG. 3, the cylinder 16 will be seen to be made up of three parts, a tubular body 21, a closed end member 22, and an access end member 23, also referred to as a rod-receiving member. Or, if desired, the parts 21, 22 may be made integral. Slidable in the cylinder toward and away from the closed end is a main piston 25 having a circular front face 26 and an annular back face 27 (see FIG. 4). Integral with the piston is the piston rod 17 having a plated and highly finished outer surface 28. A body 30 of hydraulic fluid is normally kept between the front face of the piston and the enclosed end of the cylinder.

For controlling the escape of the fluid from its normal position in the face of an axial impact, a flow control valve assembly 40 occupies a central recess formed in the piston. The control valve assembly includes an orifice bushing 42 having a circular land 43 (see FIG. 3a) which faces axially inwardly and which defines a constricted circular orifice 44. Telescoped with respect to the piston for sliding movement is a valve stem 50, of circular cross section, having a presented end 51 and an inner end 52, the presented end having a diameter slightly greater than that of the orifice 44. The stem is formed with a shoulder 53. Arranged adjacent the shoulder is a spring 54 which is seated in a recess 55 which is a continuation of the recess 41 and which extends axially into the end of the piston rod. The spring serves to press the stem axially outward so that its presented end 51 is normally in sealing engagement with the land 43 surrounding the orifice. Adjacent the land 43 is a receiving space 56 which communicates via a set of radially extending bores 57 to an annular chamber 58. The chamber 58 is connected to the back surface of the piston by a set of main fluid passages 59 in the form of angled bores.

For the purpose of enclosing and accommodating the fluid which flows through the passages 59 an annular separator piston 70 is provided (see also FIG. 4) having a fluid side 71 and a gas side 72. The separator piston normally occupies a position (FIG. 3) adjacent the back face 27 of the main piston, and defining, with the latter, a fluid receptacle 73.

The space 74 between the separator piston and the enclosing access member 23 which encircles the piston rod is filled, via a fitting 74a, with a charge of inert gas, such as nitrogen, under pressure.

The main piston 25 has a one-way return valve interconnecting the faces of the piston so that when impact has been dissipated the gas pressure acting upon the separator piston returns the separator piston to its normal position and forces the fluid through the return valve. Such one way return valve 75 is formed by a ball 76 in a passage 77, the ball being blocked during return movement by a retaining member 78. The passage 77 terminates approximately midway of a main fluid passage 59.

Thus, in operation, application of an axial impact at the coupler tending to force the piston rod and cylinder together pressurizes the confined fluid in the space 30 to a threshold level where the presented end 51 of the valve stem is unseated allowing fluid to enter the receiving space 56 and annular chamber 58 from which it flows though the passages 59 to the back face of the piston. This forces the separator piston 70 to the left which has the effect of still further compressing the gas in the space 74. Throttling of the fluid through the restricted orifice 44 absorbs most of the energy of impact, the absorbed energy showing up as an elevation in temperature of the fluid; however, a portion of the energy of impact is stored by reason of the incremental compression of the gas contained in the space 74. After the impact has dissipated itself, that is, after the force of impact is removed from the shock absorber, the main piston and separator piston both move to the right to their normal positions illustrated in FIG. 3. Such restoring movement results from the now unopposed pressure of the gas pressing the separator piston so that it returns the displaced fluid to the front side of the main piston, restoring the piston rod to its initially extended position. Movement of the main piston is not complete until the separator piston is bottomed on the back face of the main piston.

Means are provided for adjustably pre-compressing the spring to apply a preload between the stem and the land on the orifice bushing so that when the piston rod is impacted the pressure of the hydraulic fluid in the cylinder rises to a desired threshold level before any fluid is displaced through the main piston. This is accomplished by forming an outer thread in two sections 80 on the orifice bushing 42 so that the orifice bushing may be screwed inwardly and outwardly with respect to the recess in the piston. For convenience in making the preload adjustment the presented end face of the orifice bushing 42 is provided with a set of tool-receiving openings 81 arranged at a constant radius. Where such openings are used the tool may simply include correspondingly spaced projections which are inserted in the openings 81, with the tool being thereafter twisted in one direction or the other. Since, in the embodiment of the invention being discussed, the force of the valve stem which is exerted against the land is proportional, and indeed equal, to the preload exerted by the spring, the sealing force is at all times proportional to the threshold force of the fluid for which the device has been adjusted. In short, the higher the threshold force the higher is the sealing force to contain it. The sections 80 of the thread are separated by a groove to form the annular chamber 58 and are sealed to the piston.

To insure a reliable seal at the valve surface the land 43 and the presented end 51 of the stem are both highly finished. In addition, the presented end of the stem is preferably tapered, with an included angle on the order of 100 degrees, to insure 360 degree seating and to provide a slight wedging, and centering, effect between the engaged surfaces.

In the further carrying out of the invention, the valve stem 50 is preferably fitted for snug sliding movement inwardly and outwardly of the orifice bushing to minimize the likelihood that any high pressure fluid will be lost by leakage along the valve stem. To insure good sealing an auxiliary bushing 90 of anti-friction material, such as bronze, is provided having a thread 91 which is screwed into the inner end of the orifice bushing. Such auxiliary bushing is in the path of movement of the shoulder 53 on the stem 50 providing a by-product advantage which will be later referred to.

Figure 4:
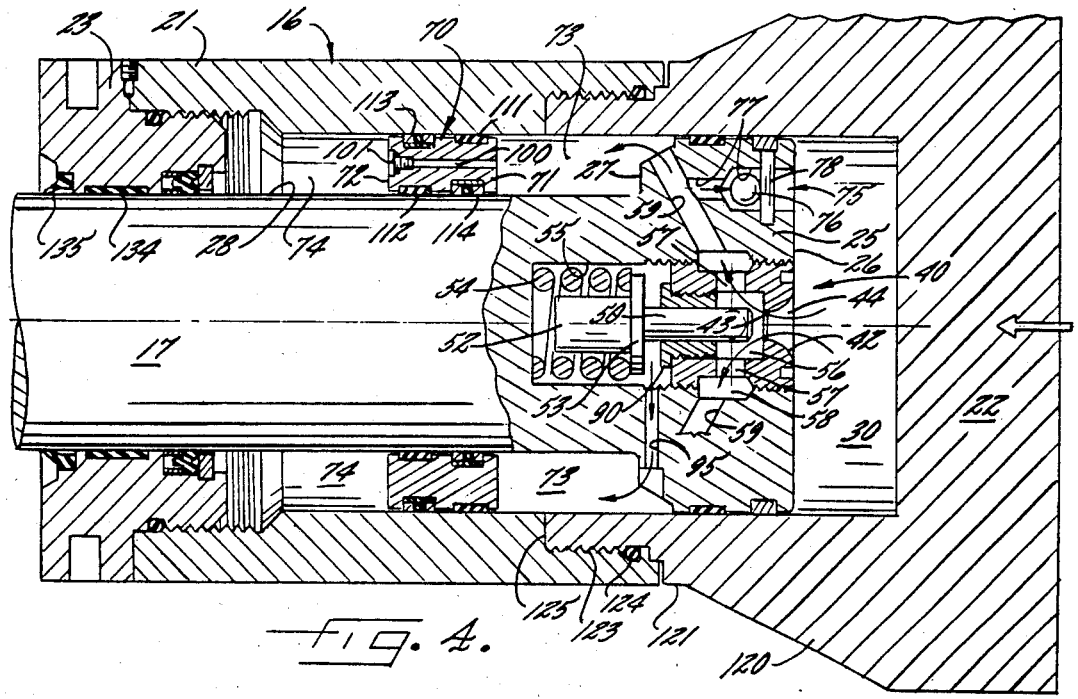
FIG. 4 is a view similar to FIG. 3 but showing the flow of fluid and the valve and piston movement resulting from impact.

For the purpose of venting any fluid which may nevertheless be forced, by reason of high pressure, along the valve stem and into the spring recess and also for venting the spring recess in the face of inward movement of the valve stem, the spring recess 55, which is filled with fluid, is constantly vented by a vent 95 (see FIG. 4).

To enable escape of any entrained air from the hydraulic fluid incident to assembly of the device a purge passageway 100 is provided extending axially of the separator piston from one face to the other, the passageway being sealed after the fluid has been purged of air by means of a screw plug 101 having an associated O-ring. It is one of the features of the present device that the separator piston 70 has an effective length-to-diameter ratio of $\frac{1}{8}$ to $\frac{1}{4}$ which is substantially less than that formerly used for floating pistons.

For the purpose of guiding the separator piston with respect to the inner wall of the cylinder and the wall of the piston rod, respectively, bearing rings 111, 112 are used. Such rings are axially offset from one another and at the respective ends of the separator piston, with the outer diameter ring being located on the fluid side of the separator piston, to scavenge, that is, push aside, any foreign particles which may be deposited from the fluid on the inner wall of the cylinder. For this purpose the rings 111, 112 are preferably formed of glass-filled nylon. The center-to-center spacing between the piston rings is preferably more than $\frac{1}{8}$ but less than $\frac{1}{2}$ of the outer diameter of the separator piston. Companion sealing rings 113, 114 are located in diagonally opposite positions.

In accordance with one of the optional features of the present invention the cylinder 16 of the present device instead of being integral may be formed of a tubular body portion and an enclosed end portion of cup shape, the end portion having a wall thickness greater than the tubular body portion, the two portions being secured together and having a seal between them of the O-ring type. This forms an annular joint which occupies a position which is spaced behind the back face of the main piston in a region of relatively low pressure thereby to reduce the likelihood of leakage at the joint. More specifically the end member 22 of the cylinder is preferably of frustoconical cup shape having a wall 120 of tapering thickness leading from a narrow neck portion 121 to a maximum overall diameter 122. The narrow neck portion 121 has a threaded connection 123 which is threaded and provided with an O-ring 124 to define a joint 125. This joint, as will be seen in FIGS. 3 and 4 lies behind the main piston and thus in a region of relatively low pressure thereby to reduce the likelihood of leakage. The large diameter 122 at the outer end matches the device to the wall-to-wall dimension of the sill thereby insuring that the shock absorber always occupies a centered position in the sill as an impact is applied. Such centering is especially important in the face of "oversolid" bottoming which may occur upon severe impact after the effective stroke of the device has all been used up.

In order to prevent a condition where the main piston might bottom within the closed end of the cylinder, the extended length of the piston rod is preferably tailored so that the normal spacing between the rod receiving member 23 and the face of the rod end support member 19 which is opposed to it is less than the head room within the cylinder; thus impact must first occur at the rod support member in the event of a bottoming condition. It is one of the features of the present cylinder construction that it is capable of resisting such "oversolid" loads repeatedly without damage.

Figure 7:
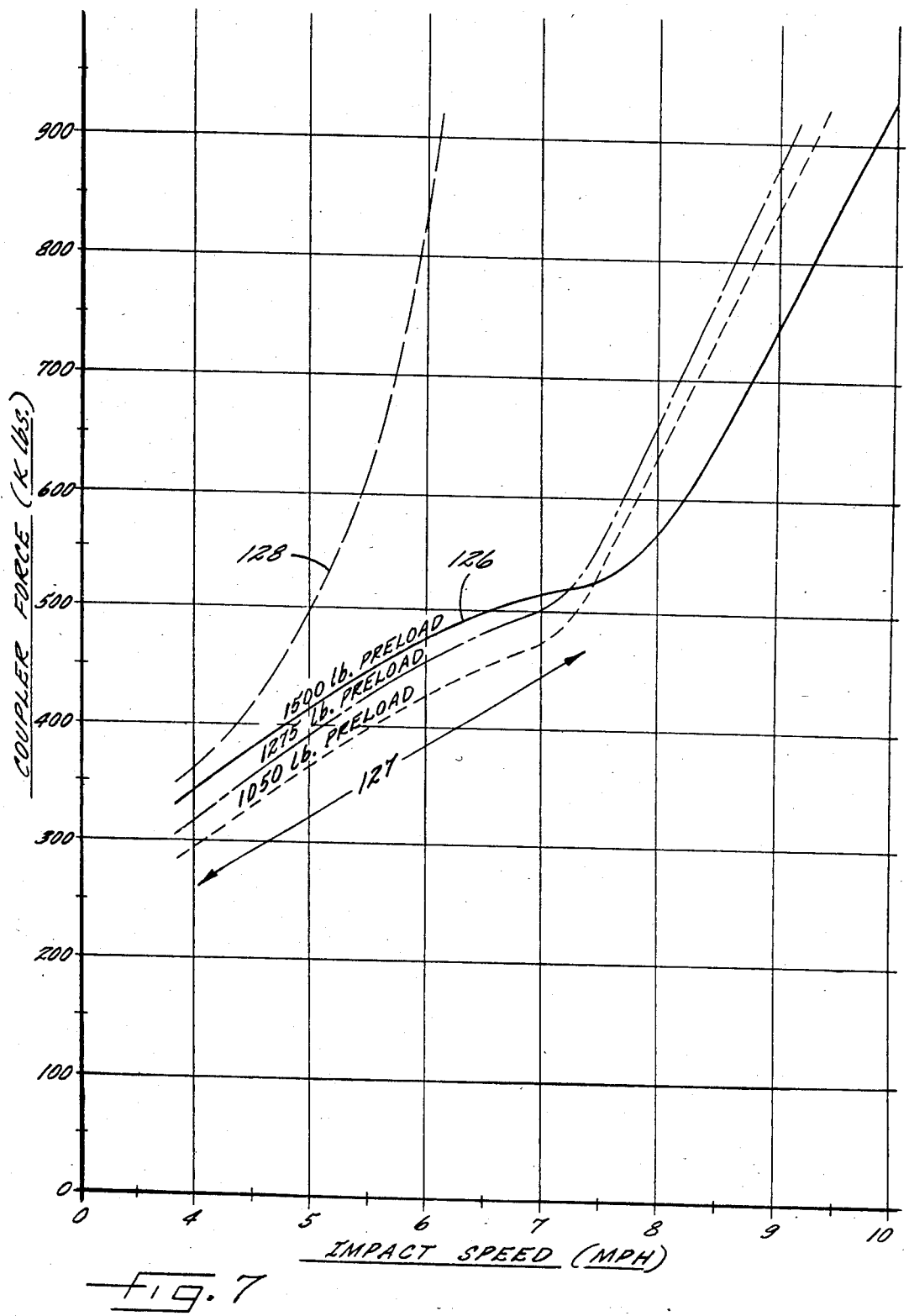
FIG. 7 shows a family of force characteristics showing the novel variation of coupler force as a function of impact speed and including a force characteristic which is typical of prior art devices.

The features and advantages of the device as thus far described are clear. The device is highly compact, relatively light in weight yet capable of maintaining coupler forces at a low level even at relatively high impact speeds of 6, 8 or even 10 miles per hour. Indeed, the force curve 126 is relatively shallow over a speed range as indicated by the region 127 in FIG. 7 which shows a typical set of characteristics. The characteristics there shown are set forth for varying degrees of preload of the spring 54. For the sake of comparison a typical characteristic of a conventional shock absorber is illustrated at 128. Taking an impact speed of 6 miles per hour as a reference value, it will be noted that, at such speed, a typical prior device exhibits the coupler force of nearly 900,000 pounds while the present device limits coupler force to below about 500,000 lbs.

Figure 8:
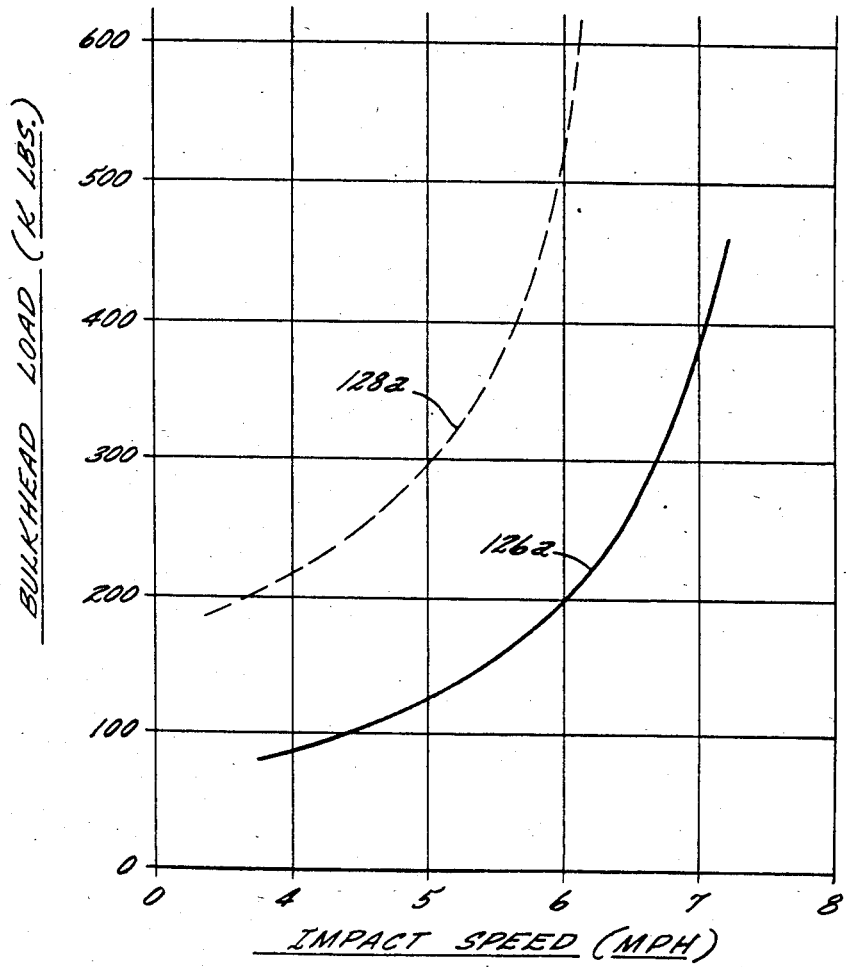
FIG. 8 is similar to FIG. 7 but shows the bulkhead load rather than the load at the coupler.

The advantage of the present construction is even more clearly shown by considering the reduction of the bulkhead load, and hence the degree of protection to the lading, illustrated in FIG. 8. Here the force characteristic of the present invention is indicated at 126a, substantially lower than that of a typical prior art device indicated at 128a.

Not only is the force characteristic relatively flat but the threshold force is conveniently and precisely adjustable at the time of original assembly, or even in subsequent usage, depending upon the type of service for which the device is intended. It is found that when impact occurs, regardless of impact speed, the device operates smoothly and progressively without snap action or chattering.

As earlier stated it is one of the features of the present invention that the fluid is positively sealed in the head of the cylinder until the instant that a predetermined and adjustable threshold pressure is reached. Thus all of the fluid contained in the body is available for cushioning when impact does occur. This is to be contrasted with many designs of conventional devices where fluid may be uselessly dissipated at a slow rate during low but continuously applied force so that when an impact does occur insufficient fluid is available to absorb the impact.

Figure 5:
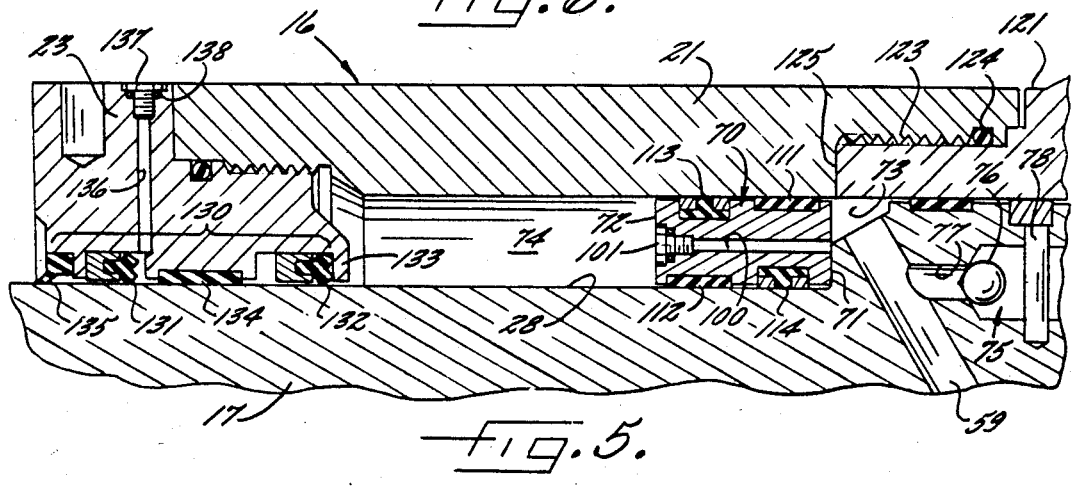
FIG. 5 is a fragmentary section showing the device of the preceding figures but with an improved rod-receiving member providing constant lubrication of the rod.

In accordance with one of the further aspects of the invention means are provided in the rod-receiving member 23, at the access end of the device, for insuring that the surface of the piston rod is constantly wetted with lubricant as the rod strokes back and forth notwithstanding the fact that the interface is gas-to-atmosphere, normally a "dry" condition. Lubrication is accomplished by a pair of axially spaced annular rod seals with means for introducing and confining liquid lubricant between the seals. Preferably at least the inner one of the rod seals is shiftable endwise for separating movement between them, the rod-receiving member having an internal shoulder for limiting the degree of separating movement. Liquid lubricant is introduced between the seals and confined therebetween so that the seals remain in a separated state, the pressure of the gas pressing axially upon the inner seal serving thereafter to keep the lubricant under pressure between the seals to insure continuous wetting of the rod by the lubricant. This is accomplished by the seal assembly 130 set forth in FIG. 5 and which includes an outer seal 131 and an inner seal 132, the inner seal 132 being axially movable but limited in its outward movement by stop surface 133 on the rod-receiving member. Between the two lubricant-retaining seals 131, 132 is a wear band 134, while a final outer seal 135 prevents outside contamination from reaching seal 131. Lubricant is added between the seals 131, 132 via a lubricant passage 136. Preferably lubricant is supplied to the lubricant passage 136 by means of a lubricant pressure fitting containing a ball check valve but for the sake of simplicity there is shown in FIG. 5 a simple threaded plug 137 and O-ring 138. Applying lubricant to the passage 136 between the two seals 131, 132 causes the latter seal to move to the right. (It is assumed in this process that the pressure of application is sufficiently great so that the lubricant may pass by the wear band 134.) Thereafter, when the passage 136 is sealed, the pressure of the gas in space 74 acting against the right hand seal 132 maintains the lubricant under pressure against the piston rod, so that as the piston rod moves either outwardly or inwardly it is constantly wetted with lubricant and the microscopic cracks and other imperfections on the surface are constantly sealed. Experience shows that such sealing even prevents the escape of gas on a molecular level so that there is substantially no net leakage during months or even years in service.

Figure 6:
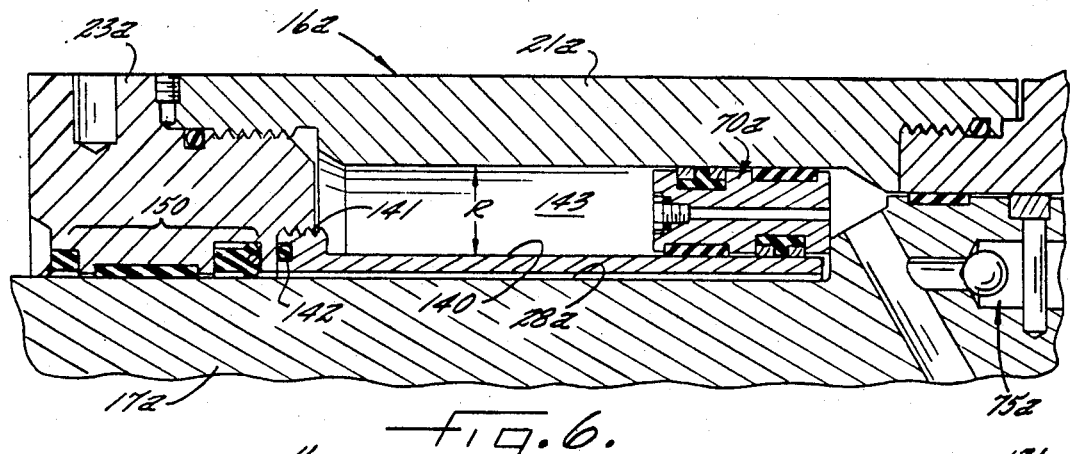
FIG. 6 is a similar section showing a modification of the construction including an internal sleeve forming a separate pocket for containing the separator piston.

A still further embodiment of the invention is shown in FIG. 6 where elements similar to those in the earlier embodiment have been given similar reference numerals, with addition of subscript "a". In this embodiment the rod-receiving member 23a has, secured to it, an auxiliary sleeve which extends axially inwardly of the cylinder, the sleeve lying in close proximity to the piston rod and radially spaced from the inner wall of the cylinder to provide an annular pocket filled with a charge of gas under high pressure, the annular separator piston being slidable in the annular pocket and sealed with respect thereto so that the separator piston is isolated from the relative stroking movements of the piston rod. Thus we provide a sleeve 140 which lies in close proximity to the surface 28a of the piston rod 17a but which is constantly spaced, by a radial distance R, from the inner wall of the cylinder. The sleeve is sealed with respect to the rod-receiving member 23a by means of a threaded connection 141 and an O-ring 142. The result is to provide an isolated pocket 143 which is enclosed by the annular separator piston 70a. As a result when hydraulic fluid appears under pressure at the back side of the main piston, its effect is to press the separator piston to the left, further compressing the gas in the space 143 and storing energy for the return movement. The only motion which takes place at the seals of the separator piston 70a is that which is due to the movement of the separator piston itself relative to the cylinder. This is to be distinguished from the action of the device in the earlier embodiment where the in and out stroking movements of the main piston and piston rod must be accommodated by the seals on the separator piston. Not only is relative motion less at the seals of the separator piston but any dynamic gas-to-atmosphere interface has been avoided.

A further advantage of the arrangement shown in FIG. 6 is that the displaced hydraulic fluid is in direct communication with the seals collectively indicated at 150 of the rod-receiving member. This is enabled by the fact that the clearance between the sleeve and the piston rod is sufficient to provide such communication. Thus the seals which engage the piston rod and the rod itself are constantly wetted by hydraulic fluid to reduce the likelihood of escape of fluid.

In the above description of the device in certain referred forms it has been assumed that the entire preload force of the spring 54 is resisted at the land 43; in other words, full use is made of the spring force at the valve surfaces. Operation in this preferred mode is achieved by making the inner end of the anti-friction bushing 90 fall short of the shoulder 53 on the stem so that no force is exerted against the inner end of the bushing by the shoulder under normal sealed conditions. It is one of the by-product features of the device that the anti-friction bushing may be unscrewed slightly with respect to the orifice bushing so that there is actual contact between the shoulder and the bushing under sealed conditions. Thus the bushing will absorb a portion of the axial load and the full preload of the spring will not be exerted at the land 43. This mode of use may be an advantage in certain types of service where extremely high preloads are used and where the preload might result in severe indenting at the valve surfaces. Note that where operated in this mode the proportion in which the spring load is shared remains unchanged over a range of in and out adjustment of the orifice bushing.

It is one of the features of the device in its preferred form that the land surface 43 is presented axially to the end of the valve stem 50 thereby limiting its further outward movement. However it is one of the features of the present construction that, if desired, the orifice may be made of the same nominal diameter as the presented end of the valve stem, in which case the full force of the spring preload is exerted against the anti-friction bushing.

In a practical construction using the design as shown and described, th main piston may have a diameter of 6.50" with 3⅜" of available travel. The maximum outer dimension (dimension 122) may be 9" for fitting in a standard linkage having an available space of 9¼". The floating or separator piston may have an axial length of 2" sliding on piston rod 4½" in diameter finely finished and plated. The leading edge of the orifice may be contoured with a constant radius of 0.500" and forms an orifice hole of 0.468" diameter. The anti-friction bushing is reamed to have a very close sliding fit with respect to the valve stem, the clearance between the two being no more than 0.001 to 0.0015 inch. The valve spring may have a 2" outer diameter, a 1" inner diameter, a free length of 2½" and a spring rate of approximately 4210 lbs. per inch. In a production design the spring preload may be set to 870 lbs. which results in a 167,000 lb. threshold force at the coupler.

The term "path of movement" as used herein to relate the auxiliary bushing 90 to the shoulder 53 in the valve stem is not intended to imply direct contact therebetween and, indeed, in the preferred embodiment of the invention the geometry is such that the shoulder will, during normal operation, fall short of the bushing to insure protective sealing at the valve surfaces.

We claim as our invention:

1. A lading protection device for a railway car interposable between the car and a coupler comprising a cylinder having a closed end and an access end, a main piston having a circular front face and an annular back face relatively slidable in the cylinder toward and away from the closed end thereof, a piston rod integral with the piston and snugly telescoped into the access end of the cylinder, a body of hydraulic fluid normally captive between the front face of the piston and the closed end of the cylinder, a flow control valve assembly in the piston, said control valve assembly including an orifice bushing occupying a recess in the piston, said orifice bushing having formed thereon a circular land facing inwardly and defining a constricted circular orifice, the control valve assembly having a valve stem telescoped with respect to the piston for sliding movement, the stem having a presented end and an inner end, the presented end of the valve stem having a diameter greater than that of the orifice, a spring in the piston at the inner end of the stem for pressing the stem axially outward so that its presented end is normally in sealing engagement with the land surrounding the orifice to prevent the flow of hydraulic fluid through said orifice and to present a predetermined surface area on the end thereof that is exposed to pressure of said body of hydraulic fluid between said front face of the piston and the closed end of the cylinder, means in said piston defining an annular chamber in communication with said land, the piston having a fluid passage for connecting the annular chamber to the back face of the piston, means for adjustably pre-compressing the spring for applying preload between the stem and the land on the orifice bushing so that when the piston rod is impacted relative to the cylinder the pressure of the hydraulic fluid in the cylinder rises to a predetermined threshold level at which the pressure of the fluid causes the stem to retreat from the orifice so that the displaced fluid may throttlingly pass through the orifice into the chamber and to the back face of the piston accompanied by absorption of energy, an annular separator piston disposed around said piston rod for relative sliding movement with respect to the piston rod, said separator piston having a normal position adjacent the back face of the main piston for defining with the latter a fluid receptacle, the space between the separator piston and the access end of the cylinder being filled with a charge of gas under high pressure which is further compressed by the retreating movement of the separator piston as the fluid is displaced, the main piston having a one-way return valve interconnecting the faces thereof so that when the impact has been dissipated the gas pressure acting upon the separator piston returns the separator piston to its normal position and forces the fluid through the return valve restoring the fluid to its normal position adjacent the front face of the main piston in readiness for a succeeding impact.

2. The combination as claimed in claim 1 in which the spring is seated in a recess in the piston, the orifice bushing having a bore adjacent the chamber in which the valve stem has a snug sliding fit, the spring recess being filled with the fluid and having a vent passage at the inner end of the bore and communicating with the fluid receptacle to accommodate any fluid which might leak past the valve stem and to preclude fluid being trapped in the spring recess upon inward sliding movement of the stem.

3. The combination as claimed in claim 1 in which the orifice bushing is sealed to the piston at its ends and in which the annular chamber is defined by forming the orifice bushing with an annular groove intermediate its ends, the orifice bushing having means including a plurality of radial openings in the orifice bushing for providing communication between the land and the annular chamber.

4. The combination as claimed in claim 1 in which an auxiliary bushing of anti-friction material mounted in the orifice bushing to provide a close but freely sliding fit with the stem while preventing escape of the fluid along the stem into the region of the spring.

5. The combination as claimed in claim 1 in which an auxiliary bushing of anti-friction material is mounted in the orifice bushing to provide a close but freely sliding fit with the stem while preventing escape of the fluid along the stem into the region of the spring, the stem having an enlarged shoulder formed thereon, the auxiliary bushing being mounted in the orifice bushing and in the path of movement of the shoulder on the stem.

6. The combination as claimed in claim 1 in which the one-way return valve is interposed between the fluid passage and the front face of the piston so that fluid is conducted through a portion of such passage both upon impact and return movement.

7. The combination as claimed in claim 1 in which the orifice bushing is axially threaded into the piston for adjustment of preload in the spring and in which the face of the orifice bushing is formed for engagement of a turning tool for making the adjustment.

8. The combination as claimed in claim 1 in which there is provided in the separator piston an axially extending purge passageway for enabling escape of any entrained air from the hydraulic fluid incident to assembly and means for sealing off such passageway after the fluid has been purged of air.

9. The combination as claimed in claim 1, the cylinder being formed of a tubular body portion and a closed end portion of frustoconical shape, the closed end portion having progressively increased wall thickness, the two portions bing secured together at a region of minimum wall thickness to form an annular joint which occupies a position which is spaced behind the back face of the main piston in a region of relatively low pressure thereby to reduce the likelihood of leakage at the joint.

10. The combination as claimed in claim 1, the cylinder being formed of a tubular body portion and a closed end portion of cup shape, the closed end portion having greater wall thickness than the tubular body portion, the two portions being secured together and having a seal between them of the O-ring type to form an annular joint which occupies a position which is spaced behind the back face of the main piston in a region of relatively low pressure thereby to reduce the likelihood of leakage at the joint.

11. The combination as claimed in claim 1 in which the separator piston has an outer diameter bearing ring and an inner diameter bearing ring, the rings being axially offset from one another and adjacent the respective ends of the separator piston, the outer diameter ring being located on the fluid side of the separator piston to scavenge any foreign particles which may be deposited from the fluid on the inner wall of the cylinder.

12. The combination as claimed in claim 11 in which the axial center-to-center spacing between the bearing rings is more than one-third but less than one-half of the outer diameter of the separator piston.

13. The combination as claimed in claim 1 in which the presented tip of the stem is symmetrically beveled so that the bevel engages and seals against the land to provide both a seal and a positive stop for the stem.

14. The combination as claimed in claim 13 in which the included angle of the bevel is on the order of 100 degrees.

15. A lading protection device for a railway car interposable between the car and a coupler comprising a cylinder having a closed end and an access end, a main piston having a circular front face and an annular back face relatively slidable in the cylinder toward and away from the closed end thereof, a piston rod integral with the piston and snugly telescoped into the access end of the cylinder, a body of hydraulic fluid normally captive between the front face of the piston and the closed end of the cylinder, a flow control valve assembly in the piston, said control valve assembly including an orifice bushing occupying a recess in the piston, said orifice bushing having formed thereon a circular land defining a constricted circular orifice, the control valve assembly having a valve stem telescoped with respect to the piston for sliding movement, the stem having a presented end and an inner end, a spring in the piston at the inner end of the stem for pressing the stem axially outward so that its presented end is normally in sealing engagement with the land surrounding the orifice to prevent the flow of hydraulic fluid through said orifice and to present a predetermined surface area on the end thereof that is exposed to pressure of said body of hydraulic fluid between said front face of the piston and the closed end of the cylinder, means in said piston defining a receiving chamber adjacent said land, the piston having a fluid passage for connecting the receiving chamber to the back face of the piston so that when the piston rod is impacted relative to the cylinder the pressure of the hydraulic fluid in the cylinder rises to a threshold level at which the pressure of the fluid causes the stem to retreat from the orifice so that displaced fluid may throttlingly pass through the orifice into the chamber and to the back face of the piston accompanied by absorption of energy, an annular separator piston disposed around said piston rod for relative sliding movement with respect to the piston rod, said separator piston having a normal position adjacent the back face of the main piston for defining with the latter a fluid receptacle, the space between the separator piston and the access end of the cylinder being filled with a charge of gas under high pressure which is further compressed by the retreating movement of the separator piston as the fluid is displaced, the main piston having a one-way return valve interconnecting the faces thereof so that when the impact has been dissipated the gas pressure acting upon the separator piston returns the separator piston to its normal position and forces the fluid through the return valve to restore the fluid to a position adjacent the front face of the main piston in readiness for a succeeding impact, the cylinder having an annular rod-receiving member for enclosing the access end of the cylinder, the rod-receiving member having a pair of axially spaced annular rod seals and having means for introducing and confining liquid lubricant between the seals for wetting and sealing any minor surface imperfections on the rod as it strokes in and out of the cylinder.

16. The combination as claimed in claim 15 in which at least the inner one of the rod seals is shiftable endwise for separating movement therebetween, the rod-receiving member having an internal shoulder for limiting the degree of separating movement, means for introducing liquid lubricant between the seals and confining the same so that the seals remain in a separated state, the pressure of the gas pressing axially upon the inner seal serving thereafter to keep the lubricant under pressure between the seals to insure continuous wetting of the rod by the lubricant.

17. A lading protection device for a railway car interposable between the car and a coupler comprising a cylinder having a closed end and an access end, a main piston having a circular front face and an annular back face relatively slidable in the cylinder toward and away from the closed end thereof, a piston rod integral with the piston and snugly telescoped into the access end of the cylinder, a body of hydraulic fluid normally captive between the front face of the piston and the closed end of the cylinder, a flow control valve assembly in the piston, said control valve assembly including an orifice bushing occupying a recess in the piston, said orifice bushing having formed thereon a circular land defining a constricted orifice, the control valve assembly having a valve stem telescoped with respect to the piston for sliding movement, the stem having a presented end and an inner end, a spring in the piston at the inner end of the stem for pressing the stem axially outward so that its presented end is normally in sealing engagement with the land surrounding the orifice to prevent the flow of hydraulic fluid through said orifice and to present a predetermined surface area on the end thereof that is exposed to pressure of said body of hydraulic fluid between said front face of the piston and the closed end of the cylinder, an annular separator piston disposed concentrically about said piston rod for relative sliding movement, said separator piston having a normal position adjacent the back face of the main piston for defining a fluid receptacle with the latter, means in said piston defining a receiving chamber adjacent the land, the piston having a fluid passage for connecting the chamber to said receptacle between said separator piston and the back face of the main piston so that when the piston rod is impacted relative to the cylinder the pressure of the hydraulic fluid in the cylinder rises to a threshold level at which the pressure of the fluid causes the stem to retreat from the orifice so that the displaced fluid may throttlingly pass through the orifice into the chamber and to the back face of the piston accompanied by absorption of energy, the access end of the cylinder being enclosed by a rod-receiving member, the rod-receiving member having thereon, in sealed relation, an auxiliary sleeve extending axially inwardly of the cylinder, the sleeve lying in close proximity to the piston rod and radially spaced from the inner wall of the cylinder to provide an annular pocket filled with a charge of gas under high pressure, the annular separator piston being slidable in the annular pocket and sealed with respect thereto, the separator piston being thereby isolated from the relative stroking movements of the piston rod.

18. The combination as claimed in claim 17 including a fluid seal interposed between the rod-receiving member and the piston rod, the space between the sleeve and the piston rod being sufficient to provide communication between the fluid receptacle and the fluid seal so that the latter is constantly supplied with lubricant for the wetting and sealing of minor surface imperfections on the rod as it strokes in and out of the cylinder.

* * * * *